United States Patent [19]
Robinson

[11] 3,815,621
[45] June 11, 1974

[54] PROPORTIONING PUMP

[75] Inventor: Art I. Robinson, Wichita Falls, Tex.

[73] Assignee: Bear Mfg. Corporation, Wichita Falls, Tex.

[22] Filed: Jan. 2, 1973

[21] Appl. No.: 320,468

[52] U.S. Cl................ 137/99, 417/33, 417/399
[51] Int. Cl.............................. F16k 19/00
[58] Field of Search ............. 137/99; 417/33, 399

[56] References Cited
UNITED STATES PATENTS

| | | | |
|---|---|---|---|
| 2,413,029 | 12/1946 | McFarland | 137/99 |
| 2,887,094 | 5/1959 | Krukemeier | 137/99 X |
| 3,330,290 | 7/1967 | Porter | 137/99 |

*Primary Examiner*—Robert G. Nilson
*Attorney, Agent, or Firm*—Wayland D. Keith

[57] ABSTRACT

A proportioning pump for combining and mixing two liquids in exacting proportions, with provisions made for automatically deactivating the pumping system if the primary liquid stops flowing or if the secondary liquid is depleted, so as to enable the liquids combined and mixed to be of the same homogenous mixture, without one or the other being increased in the mixture due to insufficient supply of either liquid. Provision is made to operate the system entirely on the pressure of the primary liquid, without the use of electricity in any form, which enables the present system to be used in hazardous areas, such as areas in which dangerous gases are present. A metering indicia is provided which enables the exact determination of the ratio of the secondary liquid to the primary liquid without test runs.

15 Claims, 17 Drawing Figures

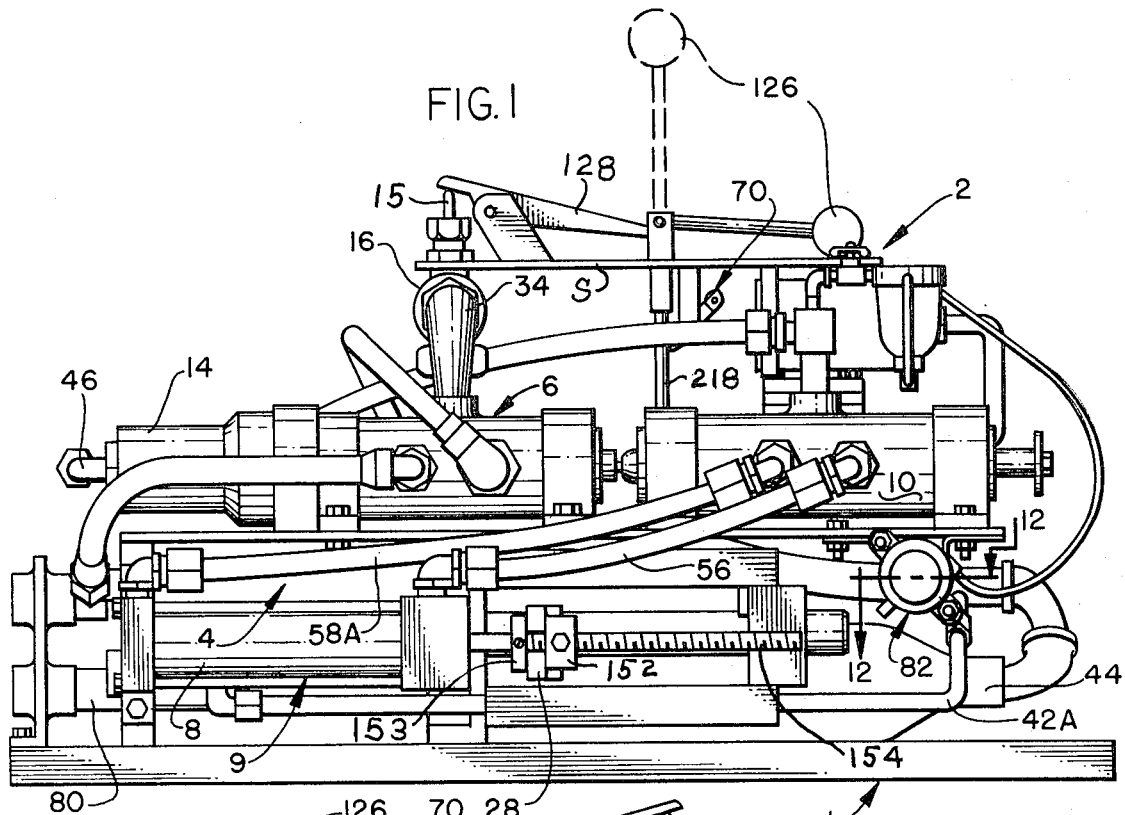
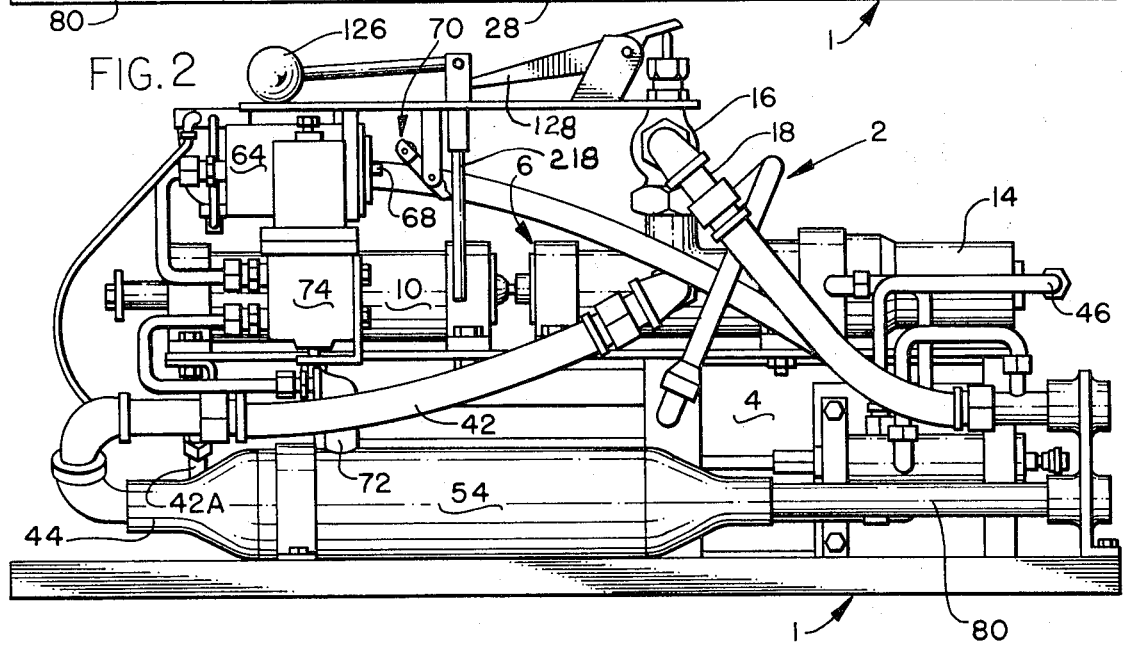
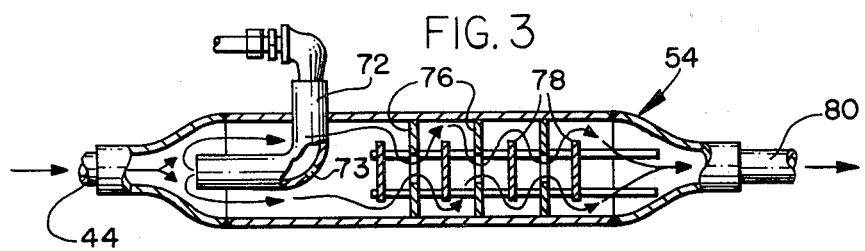

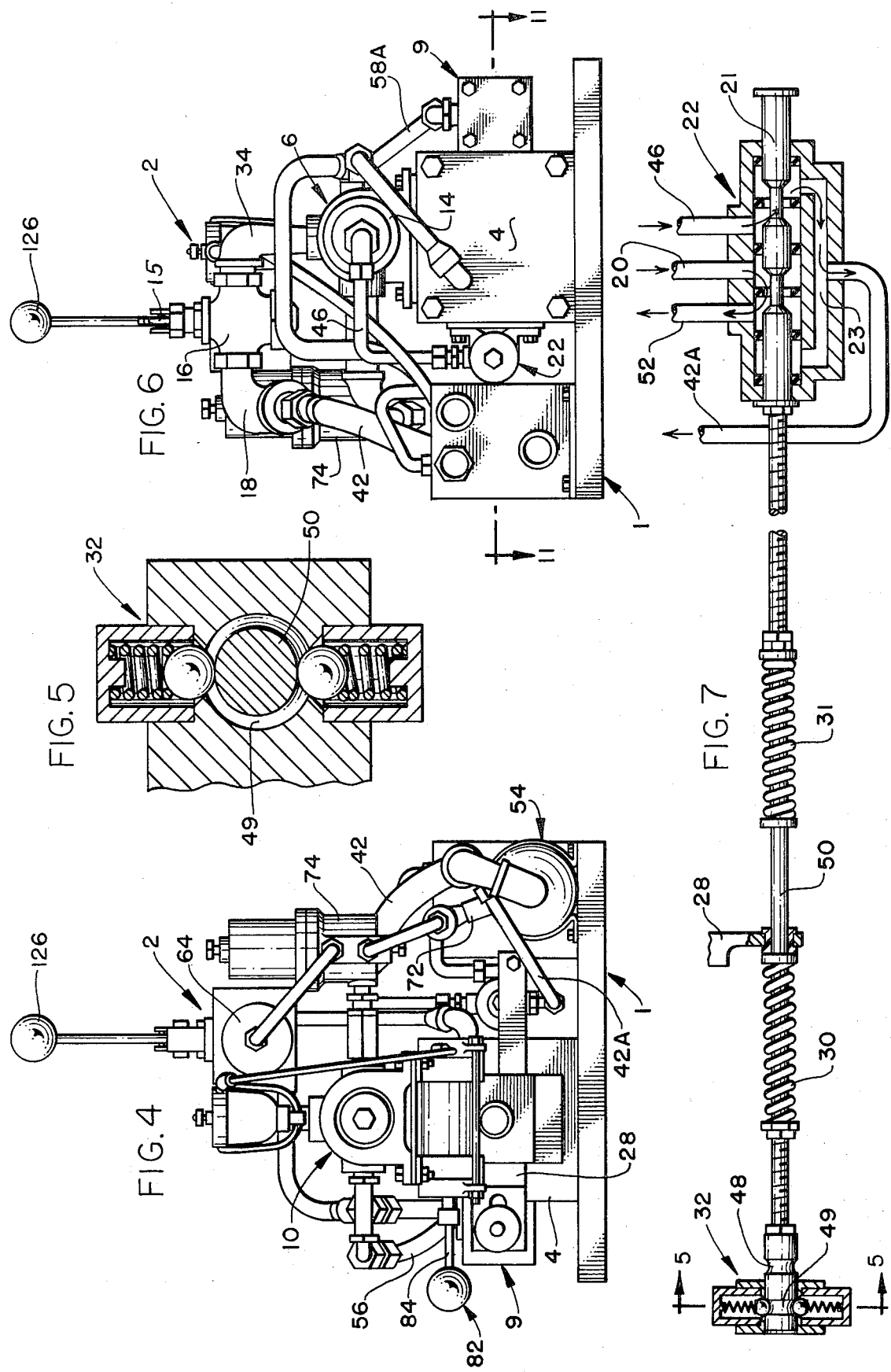

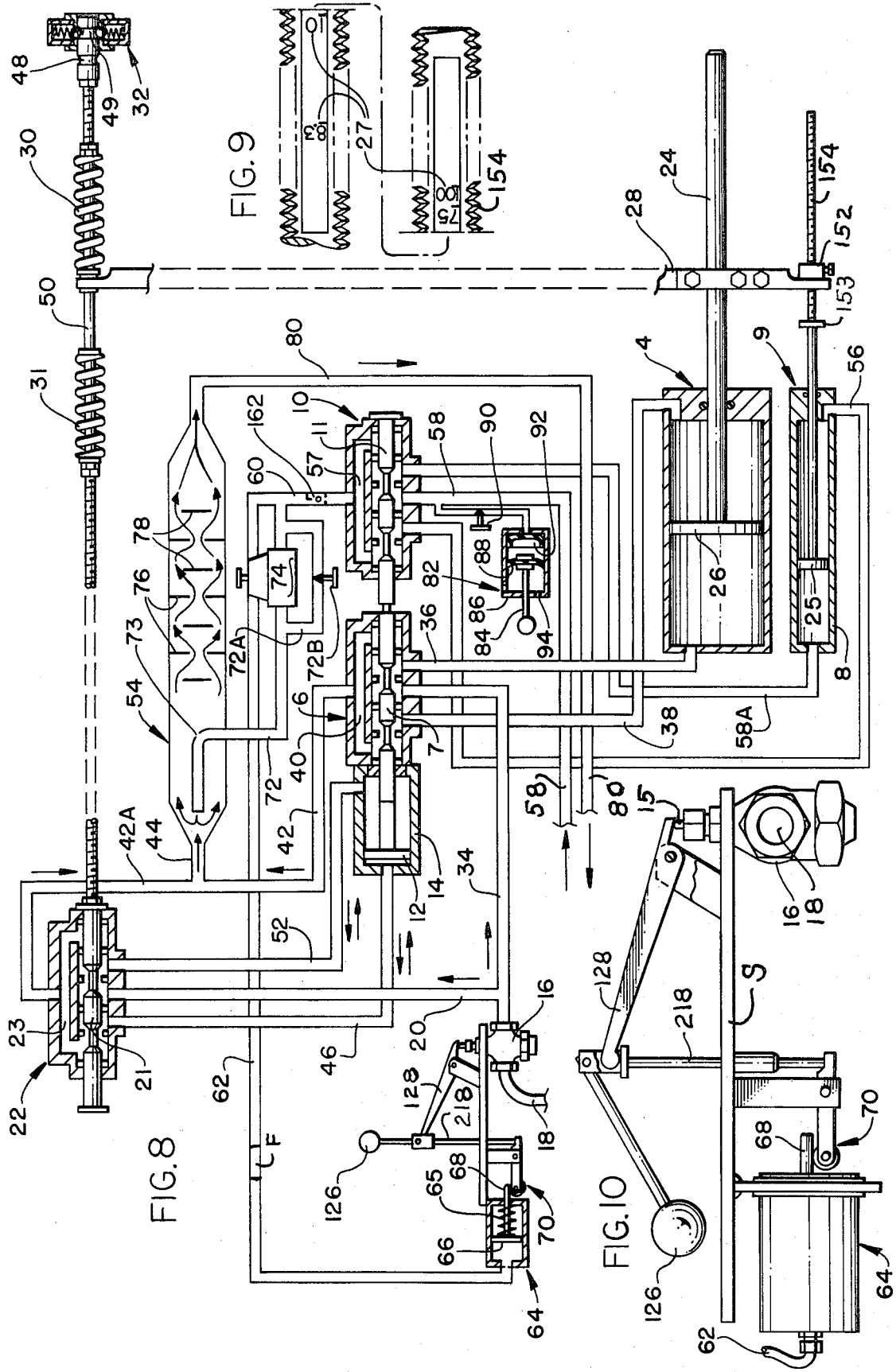

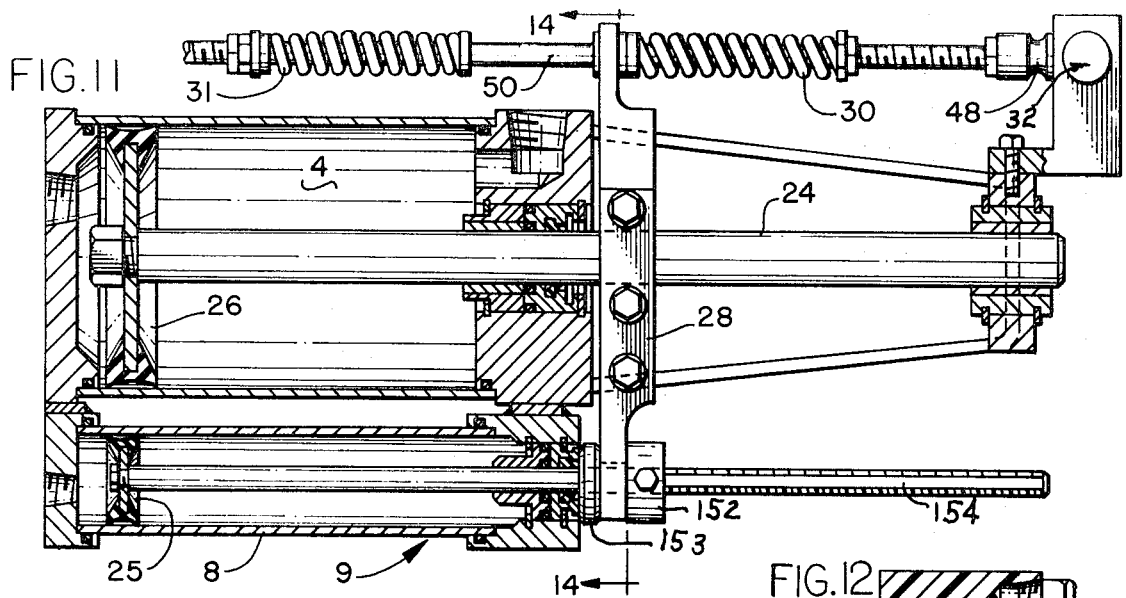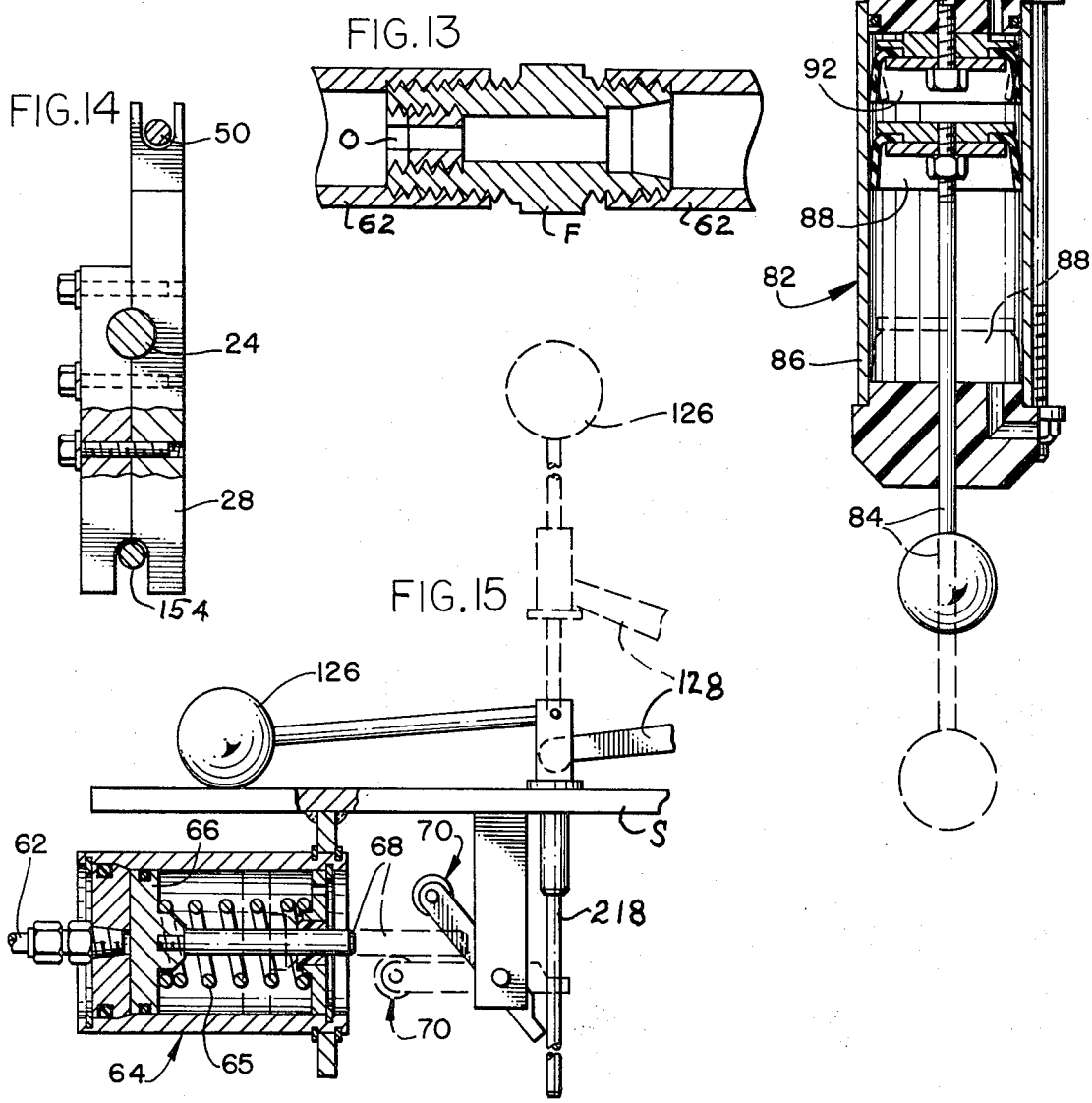

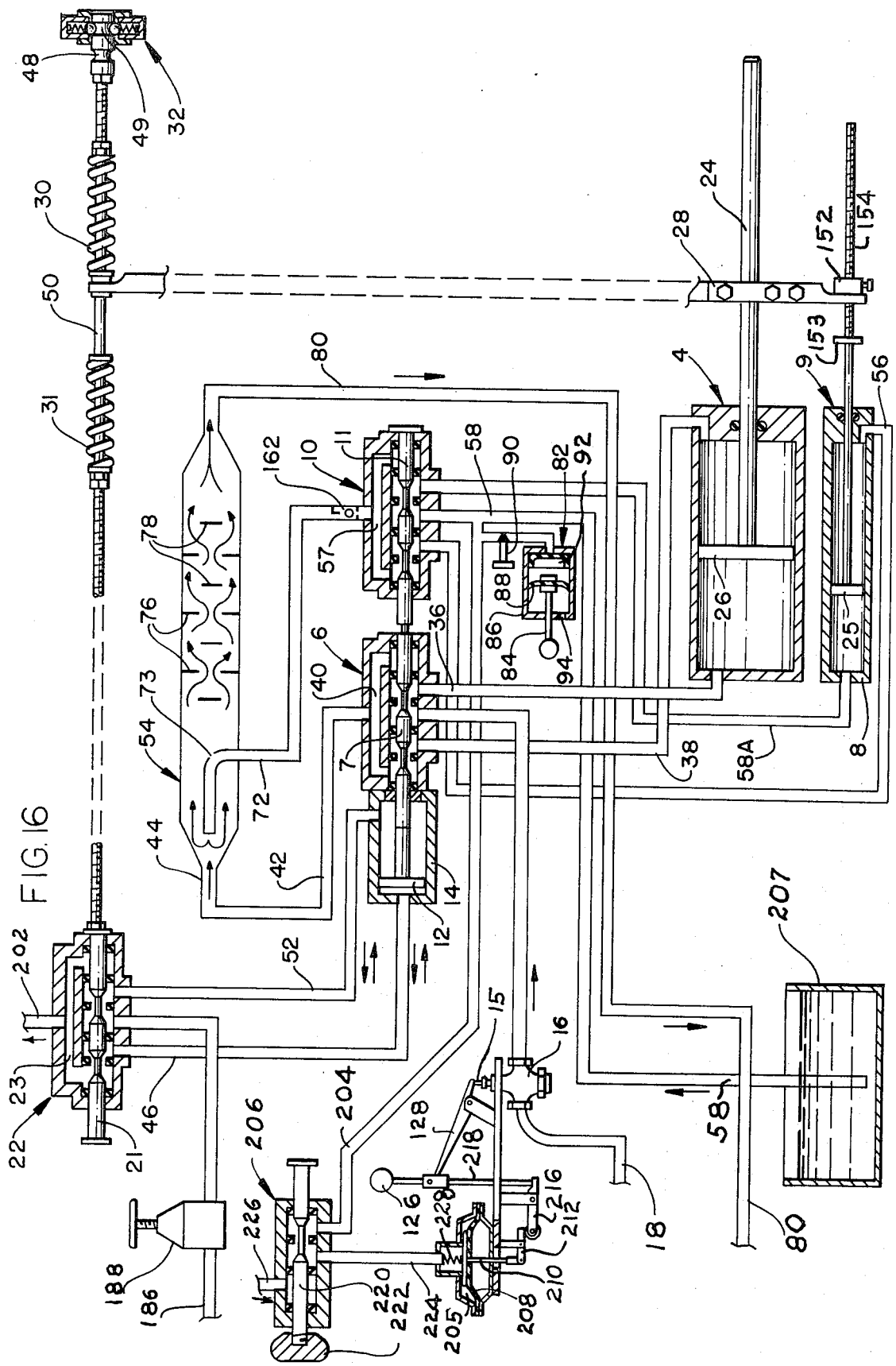

3,815,621

PROPORTIONING PUMP

BACKGROUND OF THE INVENTION

This invention relates to proportioning pumps, and more particularly to precision proportioning pumps for mixing two liquids. The present proportioning pump is adapted to mix water and a chemical, or any two liquids, such as a coolant concentrate or a chemical with water, for use with machine tools to lubricate and cool the part being machined and to lubricate and cool the cutting tool or tools machining the part.

Various proportioning pumps have been proposed heretofore but these, for the most part, had such inadequacies as to render them not entirely dependable under all conditions. If the liquid pressure, such as water pressure, failed or varied or the source of the chemical became depleted, many pumps, as used heretofore, would result in inadequate and incorrectly proportioned mixtures, causing tool failure, loss of parts and other problems incident thereto.

The present proportioning pump is quickly adjustable to vary the proportion of one liquid to another liquid, which will minimize machine shutdown time. The proportioning pump may be portable so it can be moved from one machine tool to another for mixing a coolant for machine cutting tools, thereby enabling a material savings in machinery in plants that have a large number of machine tools which use a coolant and lubricant for the cutting tools thereto; or it may be made stationary and the mixed liquid piped to a number of outlets.

The present proportioning pump may be made so it can be adjusted to cover a wide range of proportioning of liquids. However, as a matter of illustration, the present pump is described as being adjustable from 8.34:1 to 100:1 ratio of water to chemical or coolant concentrate. This is merely representative and not binding on the manufacturer of other units for other uses and proportions.

OBJECTS OF THE INVENTION

An object of this invention is to provide a proportioning pump that will combine one liquid with another liquid with exacting accuracy in the correct proportions and will conduct these liquids through a mixing chamber so that the mixture discharged therefrom will be homogeneous.

Another object of the invention is to provide a proportioning pump that is readily and accurately adjustable in scaled relation so that one liquid is mixed to acurate proportions to another liquid without the necessity of "test runs" to determine the relative proportions of the mixture.

A still further object of the invention is to provide a proportioning pump that may be used with city water pressure, both for motive power and for mixing another liquid or chemical therewith.

Still another object of the invention is to provide a proportioning pump that, when adjusted on a set proportion, will maintain this set, adjusted proportion until the water or chemical is exhausted, whereupon the proportioning pump will automatically shut off without pumping a disproportioned mixture.

A further object of the invention is to provide a proportioning pump in which the motive power to drive the timing mechanism is independent of the power that drives the pump.

A still further object of the invention is to provide a proportioning pump for mixing two liquids, which pump operates entirely on fluid power.

Yet a further object of the invention is to provide a proportioning pump which may be operated in refineries and other hazardous areas by mixing a primary liquid with a chemical or secondary liquid without the hazards of electrical shocks or explosions inherent in some types of equipment.

BRIEF DESCRIPTION OF THE DRAWINGS

FIG. 1 is a side elevational view of the proportioning pump showing a portion of the main cylinder, showing the slave cylinder for pumping a primary liquid and a secondary liquid of minor proportion, showing an adjustment screw for adjusting the stroke of the slave pump, and showing the control lever in closed position;

FIG. 2 is a side elevational view of the opposite side of the proportioning pump showing the mixing chamber connected thereto and showing the control lever of the control valve in the shutoff position;

FIG. 3 is a longitudinal sectional view through the mixing chamber, with parts being shown in elevation and with parts broken away and shown in section, to show the details of construction, with arrows being shown in the mixing chamber to designate the path of the liquids passing therethrough;

FIG. 4 is an end elevational view of the proportioning pump;

FIG. 5 is an enlarged sectional view taken on a line 5—5 of FIG. 7, looking in the direction indicated by the arrows;

FIG. 6 is an end elevational view of the proportioning pump taken from the end opposite that shown in FIG. 4;

FIG. 7 is a fragmentary, longitudinal sectional view of the plot valve switching mechanism, with parts being shown in elevation and with parts broken away and shortened to show the details of construction, with arrows to designate the path of liquids through the valve mechanism when in one position;

FIG. 8 is a diagrammatic view of the fluid system of one form of the proportioning pump with parts broken away and with parts shown in elevation to bring out the details of construction;

FIG. 9 is a greatly enlarged top plan view of fragmentary portions of the adjusting screw shown apart from the proportioning pump, and showing portions of the indicia for indicating the regulation of the proportion of one liquid to the other liquid, the intermediate portion of the screw being broken away;

FIG. 10 is a greatly enlarged view of the operating valve handle and the control lever of the automatic shutoff mechanism therefor in open position in one form of the invention, to shut off the valve and the fluid-actuated cylinder associated therewith to hold the valve in open position when operating;

FIG. 11 is a fragmentary, longitudinal sectional view through the power cylinder and the slave pump cylinder, showing the snap-action timing device in elevation, with parts broken away, and showing the adjusting nuts on the piston rod of the slave pump cylinder for adjusting the proportions of the two liquids being pumped relative to each other, which section is taken approximately on the line 11—11 of FIG. 6;

FIG. 12 is a longitudinal sectional view through a hand-operated suction pump, showing a cupped seal therein which forms a check valve, an alternate position thereof being shown in dashed outline;

FIG. 13 is an enlarged, longitudinal sectional view of a connector between two conduits showing a restricted orifice therein;

FIG. 14 is a sectional view taken on line 14—14 of FIG. 11, looking in the direction indicated by the arrows, with parts broken away and with parts shown in elevation;

FIG. 15 is a longitudinal sectional view similar to FIG. 10, but showing the automatic trip mechanism of one form of the invention in closed position in full outline, the open position thereof being shown in dashed outline, with parts broken away and shortened;

FIG. 16 is a diagrammatic view of the fluid system of the proportioning pump, with parts broken away and with parts shown in elevation to bring out the details of construction of a modified form of the invention.

DESCRIPTION OF ONE FORM OF THE INVENTION

Figure 17:
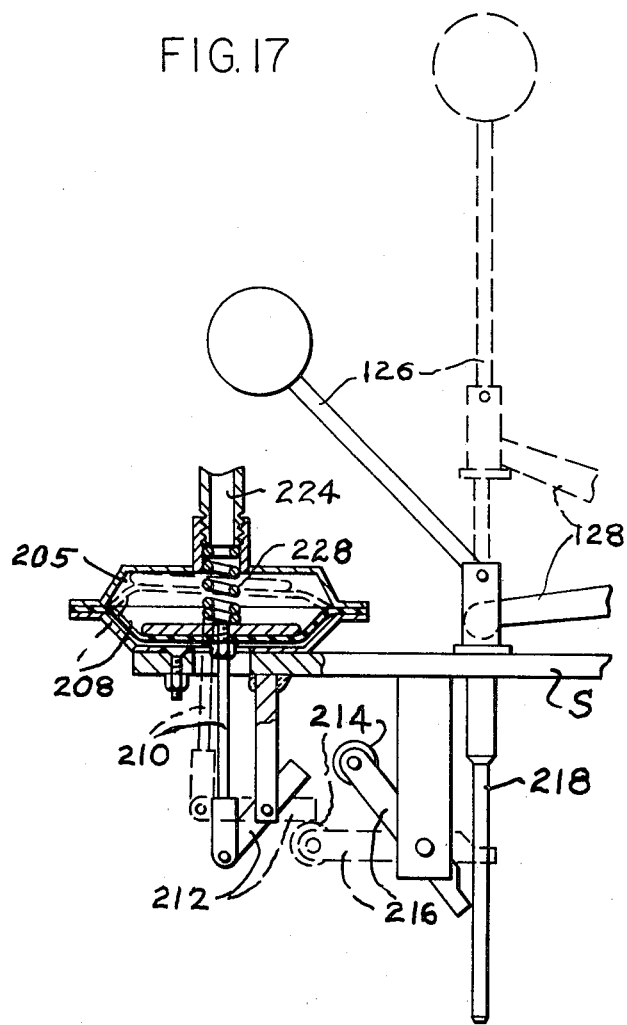
FIG. 17 is an enlarged, fragmentary, elevational view, with parts shown in section and with parts shown in dashed outline, of a handle of the control lever of the control valve, the handle of the lever thereof being shown in full outline in shut-off position, the open position thereof being shown in dashed outline.

With more detailed reference to the drawings, the numeral 1 designates generally a base upon which the proportioning pump mechanism, designated generally at 2, is mounted. The proportioning pump has a master power cylinder 4 mounted on the base 1, which power cylinder furnishes the hydraulic power to operate the system. The liquid which is discharged from cylinder 4 is mixed with a coolant concentrate, chemical or another liquid in accurate proportions.

The cylinder 4 is a double-acting hydraulic cylinder and is controlled by a four-way valve mechanism designated generally at 6, as will more fully be brought out hereinafter. A smaller or slave pump 9, which is of the double-acting type, has a cylinder 8, which pump is driven by the power cylinder 4. However, the stroke of the double-acting hydraulic cylinder pump 9 may be varied so as to mix a proportionate amount of a second liquid or chemical with the hydraulic fluid, such as water, which is used to actuate cylinder 4.

The cylinders 4 and 8 are preferably set in an approximately side-by-side spaced-apart relation, FIGS. 8 and 11, so that leakage can be quickly determined, and so the contents of one cylinder will not leak into the other cylinder.

A suction pump, designated generally at 82, comprises an operating plunger 84 within a cylinder 86, which plunger has a yieldable cup piston 88 thereon, so when valve 90 is open, air is exhausted from conduit 58 through a check valve 92, which is in the form of a flexible cup, to allow the air to be drawn thereby until the coolant concentrate or chemical fills the system. The system, which is comprised of conduit 58, valve 10, conduit 58A and cylinder 8, is evacuated of air and primed with coolant concentrate or chemical. The control valve is then ready to be opened to start piston 26 operating, which operation will cause pressure from cylinder 8 to direct chemical through valve 10 into conduits 60 and 62 leading to cylinder 64, to maintain the control valve in open position as long as water and chemical are supplied to conduits 18 and 58, respectively.

The hydraulic fluid or chemical is directed into and out of cylinder 8 by a four-way spool valve 10, FIG. 8, having a valve spool 11 therein, which valve 10 is substantially identical with valve 6, and the spool thereof is connected in end-to-end, power-driven relation with the axial spool members 7 of four-way spool valve 6, which spool valves are connected to piston 12 to drive these spools in timed relation.

Both of these four-way valves are termed spool-type valves and are moved in synchronous relation by a piston 12 reciprocating within cylinder 14. The piston 12 is operable only when the quick-opening control valve 16 is open so as to direct water, or other primary liquid being mixed, through conduit 18 into conduit 20 leading to four-way, spool-type pilot valve 22. The pilot valve 22, has a spool 21 therein, which spool connects in end-to-end relation with valve timing bar 50, when moved longitudinally the timing bar 50 compresses one of the springs 30 or 31 to cause ball detent means 32 to yield to move, with a snap action, from annular recess 49 to annular recess 48 to move the spool 21 alternately to perform a timing action.

The spool 21 of pilot valve 22 is moved by piston rod 24 which is connected to piston 26. The piston rod 24 has a transverse bar 28 fixedly secured thereto so that when the bar 28 moves a predetermined distance to compress spring 30 to cause spring and ball detent mechanism 32 to yield, it will move the pilot valve spool 21 from the position as shown in FIG. 8 thereby directing hydraulic fluid from conduit 34 and through four-way valve 6, as shown in full outline, and into conduit 36 leading to the end of cylinder 4. This will cause the liquid in the opposite end of cylinder 4 to discharge out through conduit 38 into and through an opposite port of valve 6, thence into common passage 40 in valve 6 to be discharged into conduit 42 connected therewith; then through conduit 42 to mixer port 44.

With the pilot valve 22 in the position as shown in FIG. 8, the water or hydraulic fluid will flow through conduit 20 into and through valve 22 into conduit 52, thence into the end of the cylinder 14 adjacent valve 6, which will cause piston 12 to move away from valve 6, discharging hydraulic fluid from the opposite end of cylinder 14 into conduit 46, into and through four-way pilot valve 22 into common passage 23 and discharge into conduit 42A which leads to port 44 of mixer 54. When the piston 12 has completed the stroke, the transverse bar 28 will then have moved the spool 21 thereof to the opposite position, as shown in FIG. 8, then the hydraulic fluid is directed from conduit 20 into and through four-way pilot valve 22 into conduit 46 to the opposite end of cylinder 14, which will move piston 12 toward valve 6, with the hydraulic fluid in cylinder 14 exhausting out through conduit 42A into port 44 which leads to mixer 54, thus completing the timing cycle. Upon alternate compression of springs 30 and 31 the valve timing bar 50 will be moved, by snap action, to alternately move the bar 50 from annular groove 49 to annular groove 48 to cause the spool member 21 in four-way pilot valve 22 to shift axially to provide proper timing of fluid to the power cylinder 4, and proper coordination of piston 25, so as to discharge the desired proportion of coolant concentrate or chemical into the conduits leading into and through four-way valve 10 and to the mixer 54 as set out herein.

As the water or other primary liquid is directed through conduit 20 and conduit 34, the water or other liquid is being discharged out of the opposite end of cylinder 4 into conduit 38 through the port in valve 6, to which the conduit 38 connects; thence into the common outlet passage 40 into conduit 42 leading to conduit 44 which leads into mixer 54.

Simultaneously, the secondary liquid, such as a coolant concentrate or chemical, is discharged from cylinder 8 on the out-movement of piston rod 154 and piston 25, and coolant concentrate or chemical in cylinder 8 will be discharged into conduit 56 as the coolant concentrate or chemical is being drawn into the opposite end of cylinder 8, by suction on conduit 58A.

The chemical is thus forced through conduit 56 into and through four-way valve 10, when the spool 11 thereof is in the position as shown in FIG. 8, and with the liquid being discharged into common passage 7 and into conduit 60, past check valve 162, with one branch 62 of the conduit leading to a cylinder 64, in piston 66 will be urged outward, to urge a moveable rod 68, which forms an abutment, outward. This movement will prevent trigger mechanism 70 from pivoting upward as long as the conduits are filled with chemical and water and the pressure is sufficient to hold the valve 16 in the position as shown in FIG. 8.

Conduit 60 also connects with conduit 72 in which conduit a back-pressure regulator 72 is positioned, which will release liquid under pressure out through conduit 72 and opening 73 into mixer 54, counter to the incoming water or other liquid in conduit 44. The liquids will flow through a tortuous path between baffles 76 and through the openings 78 to cause the two liquids to be thoroughly mixed; the mixed liquids are then discharged out through conduit 80 to machine tools or whatever requires the mixing of one liquid in an exacting ratio to another liquid.

In by-pass conduit 72A an adjustable by-pass valve 72B allows fluid under pressure in conduit 72 to flow around the back-pressure regulator at any small, predetermined rate, at all times. When the supply has been exhausted, and the chemical cylinder pumping the chemical ceases to pump, pressure upstream of back-pressure regulator 74 will be bled off to downstream, low pressure through conduit 72. This will also decrease pressure in conduit 62 and cylinder 64, which will allow spring 65 to return piston rod 68 and trip trigger 70 to close valve 16 and shut off pump operation.

DESCRIPTION OF THE SECOND FORM OF THE INVENTION

The second form of the invention is shown diagrammatically in FIG. 16, with a vacuum-actuated control valve being shown in FIG. 17. This form of the device is for mixing two liquids, such as water and a chemical or a concentrated coolant material, so as to form a homogenous mixture for use, as a coolant and lubricant to be used with cutting tools in machine parts, which coolant, when mixed in the proper proportions, lubricates the cutting tool and parts being cut to minimize the power required to perform the cutting action, and also lubricates the tool and the parts being machined.

While this form of the invention will be described somewhat in detail as to the mixing of water with a coolant liquid concentrate for use with machine tools, it is to be understood that this is illustrative only. However, these liquids can be either aqueous or non-aqueous, and can be used around refineries and chemical plants for mixing the correct proportioned amounts of additives to the primary liquid.

This form of the device has a water or primary liquid inlet conduit 18 with a chemical or secondary liquid inlet conduit 58. The conduit 58 extends into reservoir 207, an to charge the system, a hand-actuated evacuating pump 82 is provided and connected in fluid communication with conduit 58. With a manually operated valve 90 in open position, the hand-actuated suction pump 82 is operated to actuate a moveable piston 88 which is in the form of a cup, and a stationary cup 92 which forms a check valve in cylinder 86. The suction pump 82 is actuated to withdraw air from conduit 58 and to discharge air out through port 94 until the conduit 58, as well as the four-way valve generally designated at 10, and conduits 58A and 56, conduit 204, three-way valve 206, conduit 224 an vacuum chamber 205 are evacuated of air and the pump and conduits are filled with coolant concentrate or chemical and the chemical or slave pump 9 is primed. Upon movement of piston 25 in pump 9, liquid will be withdrawn through conduit 58 from a reservoir 207 which reservoir is lower than the cylinder 8 of the slave pump 9.

With the conduits, valve and pump thus primed, valve 90 is manually closed so there will be no leakage of liquid or air into or through the hand-operated pump 82.

With the chemical system thus charged with the liquid as set out above, the control handle 126 is moved from the position as shown in full outline in FIG. 17 to the position shown in dashed outline thereon, which will move lever 128 upwardly to open water inlet valve 16; whereupon water or other primary liquid under pressure will pass through conduit 18 and valve 16 into a central port of four-way valve 6, and with the four-way valve 6, which is of the spool type, being in position as shown in FIG. 16, the fluid will then be directed into conduit 36 and into the cylinder 4 opposite the piston rod 24, on which a piston 26 is mounted. Piston 26 is moveable longitudinally of cylinder 4 by the hydraulic pressure of liquid entering from conduit 36, and liquid in the cylinder 4 will be exhausted through conduit 38 into a port in hydraulic valve 6 on the opposite side of the spool 7 thereof, and thence into a common passage 40 and conduit 42, as will be described more fully hereinafter.

A bifurcated member 28 is fixedly secured to piston rod 24, such as shown in FIGS. 8, 11, 14 and 16. As the threaded piston rod 154 moves outwardly, the bifurcated, transverse member 28 will engage an abutment, such as nut 152, which abutment is adjustably secured on the threaded piston rod 154 of cylinder 8 of slave pump 9, which cylinder is adapted to pump chemical or coolant concentrates. As the piston rod 154 and piston 25 move outwardly coolant concentrate or other chemical is drawn into cylinder 8 through conduit 58A and the chemical or coolant concentrate on the opposite side of piston 25 is discharged from cylinder 8 into conduit 56 through four-way valve 10 and out through common passage 57, past check valve 162 into conduit 72 and into mixer 54, with part of the liquid being discharged passing out through opening 73, as will best be seen in FIG. 16.

Upon reversal of the piston rod 24 and piston 26, the transverse member 28 will move against a stop or abutment 153, which is fixedly secured to threaded piston rod 154, which stop is engaged by the bifurcated portion of transverse bifurcated member 28 at a selected position to move the piston rod 154 inwardly which will discharge the coolant concentrate or chemical into conduit 58A which leads to and through four-way valve 10 and out through common passage 57, when the spool 11 of four-way valve 10 is in the opposite position from that in the aforementioned operation, and simultaneously, coolant concentrate or chemical will be drawn from reservoir 207 through conduit 58 and into the center port of four-way valve 10, which will pass therethrough and when the opposite position from that shown in FIG. 8, will be drawn through conduit 56 into the opposite end of cylinder 8. With the coolant concentrate or chemical being discharged through conduit 72 into mixer 54, the coolant concentrate or chemical passes through the mixer by baffles 76 and 78 to be discharged into outlet pipe 80 simultaneously with water or other liquid being discharged from cylinder 4 through four-way valve 6 and conduit 52 into the end of the mixer 54, as indicated in FIG. 16.

The threaded piston rod 154 preferably has indicia thereon to indicate the percentage of coolant concentrate or chemical discharged into conduits 56 and 58A with respect to the water or other primary liquid discharged from cylinder 4 into conduits 36 and 38 into four-way spool-type valve 6 which operates and moves simultaneously with four-way spool valve 10 by the timed action of piston 12 within cylinder 14, which is connected in end-to-end relation with spools 7 and 11 of the respective four-way spool valves 6 and 10.

With the spool valve 10 in position as shown in FIG. 16, the liquid will pass out through a port into a common passage 57 therein, and thence out through a port into conduit 72 and upwardly through a check valve 162. Conduit 72 will direct coolant concentration or chemical into a mixer 54 simultaneously with water or other liquid flowing through conduit 42 into mixer 54, as indicated by the arrow in FIG. 16. In so doing, the two liquids are throughly mixed by passing through a tortuous path by and between baffles 76 and 78 in the mixer 54 to be discharged into a conduit 80 which leads to the point of use.

As the liquid under pressure, such as water, is being directed to the conduit 18 and through valve 16 and conduit 36 into cylinder 4, the piston rod 24 will move outward against tension of spring 30 to compress the spring, and at the same time move the nut or abutment 152 outward to move the threaded piston rod 154 and piston 25 outward until the desired amount of coolant concentrate or chemical is directed through conduit 56, valve 10 and conduit 72 into mixer 54. At this time, the spring pressed ball detent means 32, within an annular groove 49, will yield and the pilot valve rod 50 will move longitudinally with a snap action and the spring pressed ball detent means 32 will move into annular groove 48 on the end of rod 50. In making this movement, the spool 21 of valve 22 will be moved longitudinally to the reverse position to that shown in FIG. 16, so air will then be directed from conduit 186 through pressure regulator 188 into the center port of pilot valve 22 and through conduit 46 to reverse the position of piston 12 and the spools of valves 7 and 11.

The four-way valves, designated generally by the numerals 6 and 10, are spool-type valves and are actuated by a piston 12 within cylinder 14, preferably by air, in this form of the invention. This air is directed from a source of supply, under pressure from conduit 186 which leads to the center port of four-way valve 22, and with the air flowing into an open port leading to conduit 52 and into cylinder 14 to move the piston 12 and spools 7 and 11 of the respective valves 6 and 10 to the left as viewed in FIG. 16, with the air that is exhausted from cylinder 14 being directed into conduit 46, out through common passage 23, the air is exhausted out through conduit 202 to atmosphere.

By using air which is regulated to a pressure of approximately 25–30 pounds in this instance, the movement of piston 12 can be so regulated as to open and close ports of valves 6 and 10 leading to conduits 36 and 38 and conduits 58A and 56. As the piston 12 moves back and forth in cylinder 14, the four-way valves 6 and 10 alternately close to actuate piston 26 within cylinder 4, and with the psiton 26 actuated back and forth, the transverse bar 28 secured to piston rod 24 will cause the transverse bar 28 to alternately engage abutments 152 and 153 on threaded piston rod 154 to move the rod and piston 25 to exhaust coolant concentrate or chemical or other selected liquids into conduits 56 and 58A to be mixed with a primary liquid, such as water or the like, which is discharged from cylinder 4 into conduits 36 and 38, as set out herein.

The valve operating lever 126 is lifted to an upright position to move lever 128 to depress vavle stem 15 to open the valve to start the pump operating and a suction is then developed on conduit 58 by movement of piston 25 in cylinder 8. With the manually operated three-way spool valve 206 in the position as shown in FIG. 16, the vacuum will act upon diaphragm 208 so as to move the diaphragm upwardly against the force of spring 228, to which diaphragm is connected a rod 210. In so doing, a pivoted lever 126 is moved from the position shown in full line in FIG. 17 to the position shown in dashed outline therein, whereupon a pivoted trigger 212 will move into a position, as shown in FIG. 17 in dashed outline, to be in bearing relation with roller 214 on lever 216, which will hold the rod 218 in supported relation thereabove. This will hold valve operating lever 128 in the position as shown in dashed outline in FIG. 17 to maintain the valve stem 15 of valve 16, FIG. 16, depressed to maintain the valve 16 in an open position, which will render the system operative.

With the proportioning pump operating, if chemical supply in reservoir 207 is depleted, the liquid in conduit 58, conduit 204 and conduit 224 will be pumped out, and the pressure in these conduits will increase from vacuum to atmospheric pressure. This will permit spring 228 to move diaphragm 208 and rod 210 downwardly to the position shown in full outline in FIG. 17, which will move trigger lever 212 upwardly, which will permit lever 216 to pivot upwardly adjacent trigger lever 212, which will permit rod 218 and lever 128 to move downward to release pressure on valve stem 15 to close valve 16, which will shut off the primary liquid to conduit 34 and the master power cylinder 4, which will deactive the entire system.

When it is desired to shut off the mechanism, to cease operation, a plunger 220, having a pull knob 222 thereon, is moved to the left, as viewed in FIG. 16, which will move the three-way valve to an opposite position shown therein, to connect conduit 224 with a conduit 226 leading to the atmosphere. This will permit air to pass therethrough to move the diaphragm 208 under the influence of spring 228, to the position shown in full outline in FIG. 17, which will move trigger lever 212 upward to the full line position, to trip lever 216, which will permit rod 218 to move downwardly to enable the valve lever 128 to close valve 16 to shut off the water or other liquid to cylinder 4 so as to deactivate the entire system.

I claim:

1. A device for metering two liquids to form a mixture of predetermined ratios, comprising:
   a. a primary liquid inlet conduit,
      1. a source of primary liquid under pressure,
   b. a primary liquid control valve within said conduit,
      1. latch means to hold said primary liquid control valve closed when in one position,
      2. said latch means adapted to permit said valve to open when in another position,
   c. a first primary liquid four-way switching valve,
      1. said primary liquid inlet conduit connected in fluid communication with said first primary liquid four-way switching valve,
      2. first and second primary liquid conduits leading from said first four-way switching valve,
   d. a first double-acting master power cylinder including a reciprocable piston mounted therein and having a piston rod secured thereto and extending outwardly therefrom in fluid-tight relation,
      1. said first primary liquid conduit connected in fluid communication with one end of said master power cylinder,
      2. said second primary liquid conduit connected in fluid communication with the opposite end of said master power cylinder,
   e. a secondary liquid suction inlet conduit,
      1. a source of supply of secondary liquid,
   f. a second four-way secondary liquid switching valve,
      1. said secondary liquid inlet suction conduit connected in fluid communication with said second four-way switching valve,
      2. first and second secondary liquid conduits leading from said second four-way switching valve,
   g. a slave pump cylinder including a reciprocable piston mounted therein and having a piston rod secured thereto and extending outwardly therefrom in fluid-tight relation,
      1. said first secondary liquid conduits connected in fluid communication with one end of said slave pump cylinder,
      2. said second secondary liquid conduits connected in fluid communication with the opposite end of said slave pump cylinder,
   h. an evacuation pump connected in fluid communication with said secondary liquid suction inlet conduit to evacuate air from said conduit, said pump and said slave pump cylinder, to draw said secondary liquid into said conduit, second four-way secondary liquid switching valve, and slave pump cylinder, to move said latch means that hold said primary liquid control valve open into position to enagle said valve to be latched in open position,
   i. a liquid mixer,
      1. said liquid mixer having a primary liquid inlet port formed therein,
      2. said liquid mixer having a secondary liquid inlet port formed therein,
      3. spaced-apart baffles within said liquid mixer,
      4. said liquid mixer having an outlet port formed therein,
   j. a primary liquid discharge conduit connected in fluid communication with said first primary liquid four-way switching valve, and connected in fluid communication with the primary liquid inlet port of said liquid mixer,
   k. a secondary liquid discharge conduit connected in fluid communication with said second four-way secondary liquid switching valve, and connected in fluid communication with the secondary liquid inlet port of said liquid mixer, and
   l. a conduit connected in fluid communication with the discharge port of said liquid mixer to direct mixed liquid therefrom,
   m. a four-way pilot valve,
      1. a fluid inlet conduit connected in fluid communication therewith,
      2. first and second fluid conduits connected to said four-way pilot valve,
   n. a third double-acting fluid powered cylinder including a reciprocable piston mounted therein with a piston rod secured thereto and extending outward therefrom in fluid-tight relation,
      1. said piston rod connected to said first four-way and said second four-way switching valves to move said valves in synchronous timed relation,
      2. said first and second fluid conduits connected in fluid communication with the opposite ends respectively of said third double-acting fluid powered cylinder,
      3. said four-way pilot valve having a discharge port therein to discharge fluid therefrom, and
      4. connection means connecting said piston rod of said master power cylinder to alternately switch said pilot valve with a snap action.

2. A device for metering two liquids to form a mixture of predetermined ratios, as set forth in claim 1 wherein:
   a. said third double-acting fluid powered cylinder is air actuated,
      1. an air conduit adapted to direct air at a predetermined pressure into and through said four-way pilot valve to direct air into said conduits leading to said third double-acting fluid-powered cylinder, and
      2. said discharge port in said four-way pilot valve discharges air therefrom to atmosphere.

3. A device for metering two liquids to form a mixture of predetermined ratios, as defined in claim 2; wherein
   a. a conduit connects to said secondary liquid suction inlet conduit,
   b. a three-way valve within said first mentioned conduit,
   c. a fluid actuator,
      1. a housing for said fluid actuator,
      2. a movable member within said fluid actuator, 3. a spring biased between said housing and said movable member,
4. fluid actuator mounting means,
5. said fluid actuator being mounted on said mounting means,
6. a trigger means pivotally mounted on said fluid actuator mounting means,
7. a rod connected to said movable member and pivotally connected to said trigger means,
8. a further conduit connected between said three-way valve and said fluid actuator, so when said three-way valve is in one position, said fluid actuator will be moved to one position, and when said three-way valve is in another position to close off air to said first mentioned conduit and to connect said conduit leading to said fluid actuator to a port leading to atmosphere, said fluid actuator will be moved to another position by said spring,
9. said primary liquid control valve having a movable stem therein to open and close said valve,
10. a pivoted lever associated with said valve to move said stem into closed position, when said lever is in one position and to permit said stem to move to open position when said lever is in another position,
11. the end of said pivoted lever extending outwardly, and
12. a longitudinally movable rod connected near the outer end of said lever and engagable with said latch means when said trigger means is in one position and disengageable therefrom when said movable member, of said fluid actuator, is moved to another position so as to permit said valve stem to move to open said primary liquid control valve.

4. A device for metering two liquids to form a mixture of predetermined ratios, as defined in claim 3; wherein
a. said movable member within said fluid actuator is a diaphragm.

5. A device for metering two liquids to form a mixture of predetermined ratios, as defined in claim 3; wherein
a. said latch and trigger means are adapted to actuate said primary liquid control valve upon exhausting said secondary liquid from said secondary inlet conduit leading to said second four-way secondary liquid switching valve, which permits air to enter said conduit leading to said pilot valve to move said movable member in said fluid actuator by the action of said spring.

6. A device for metering two liquids to form a mixture in predetermined ratios, as defined in claim 1; wherein
a. said secondary liquid inlet conduit leads from the source of supply of said secondary liquid at a lower elevation than said secondary four-way secondary liquid switching valve.

7. A device for metering two liquids to form a mixture in predetermined ratios, as defined in claim 1; wherein
a. a valve within said conduit intermediate said evacuation pump and said source of supply of secondary liquid to selectively close said conduit.

8. A device for metering two liquids to form a mixture of predetermined ratios, as defined in claim 1; wherein
a. said pilot valve has an outwardly extending connecting rod,
1. a pair of spaced apart, adjustable springs on said connecting rod,
b. a transverse bar, having an opening formed near each end thereof, connected to said piston eod of said first double-acting master power cylinder,
1. one said opening in said transverse bar adapted to receive the outwardly extending rod of said pilot valve,
2. the other opening in said transverse bar adapted to receive the piston rod for said slave pump cylinder therethrough,
3. a pair of abutments on said piston rod of said slave pump cylinder,
4. at least one of said abutments on said piston rod of said slave pump cylinder being adjustable to selectively permit lost motion between said abutments,
5. said springs on said outwardly extending pilot valve connecting rod being adjustable therealong so said transverse bar will aternately engage said springs to move said connecting rod longitudinally,
6. spaced apart grooves on said connecting rod,
7. detent means alternately engageable in said grooves to hold said rods in one position, in one groove, until one of said springs is compressed by the movement of said transverse bar to move the connecting rod longitudinally, by snap action, to enable the detent means to engage the other of said grooves to reverse said pilot valve action, which directs fluid into the opposite end of said double-acting master power cylinder and the connecting rod thereof to cause said piston rod of said slave cylinder to move in the opposite direction to engage one of said abutments on said connecting rod of said slave pump cylinder to move said piston therein a predetermined length of travel to direct said secondary liquid into said mixer to be mixed with said primary liquid in a proportioned amount.

9. A device for metering two liquids to form a mixture of predetermined ratios, as defined in claim 8; wherein
a. said piston rod of said slave pump cylinder has indicia spaced apart thereon, so one of said abutments may be adjusted longitudinally of said piston rod to give an exact setting of proportions of liquids being pumped.

10. A device for metering two liquids to form a mixture of predetermined ratios, as defined in claim 1; wherein
a. said evacuation pump is a hand actuated pump,
1. said evacuation pump having a cylinder,
2. a yieldable piston cup, having a piston rod secured thereto and extending outward from said cylinder, said piston cup adapted to seal with the bore of said cylinder when moved in one direction and to permit the passage of air thereby when moved in another direction,
3. a second yieldable cup mounted in said cylinder and secured against longitudinal movement to permit air to pass thereby in one direction and to prevent retrogression of air, when the air is moved in the opposite direction, which yieldable cups form valve members to enable air to be evacuated from said secondary liquid inlet suction conduit.

11. A device for metering two liquids to form a mixture of predetermined ratios, as defined in claim 1; wherein
   a. said first primary liquid four-way switching valve and said second four-way secondary liquid switching valve being in longitudinal alignment and moveable longitudinally by said piston rod of said third double-acting fluid powered cylinder, are spool type valves.

12. A device for metering two liquids to form a mixture of predetermined ratios, as defined in claim 1; wherein
   a. said primary liquid and said secondary liquid being discharged from said outlets of said four-way valves is directed into said liquid mixer from opposite directions.

13. A device for metering two liquids to form a mixture of predetermined ratios, as defined in claim 1; wherein
   a. a fluid chamber is provided,
      1. a movable member in said chamber which is responsive to the pressure of said primary liquid,
      2. a latch rod extending outward from said chamber to engage said latch means to hold said valve closed, when a predetermined pressure is present in said chamber,
      3. spring means adapted to move said plunger out of engagement with said latch, and
   b. a spring within said primary liquid control valve within said primary liquid inlet circuit to close said valve upon disengagement of said latch rod from said primary liquid control valve.

14. A device for metering two liquids to form a mixture of predetermined ratios, which device comprises;

a. a master power cylinder having a piston and a piston rod therein,
   b. a slave cylinder having a piston and a piston rod therein,
      1. said slave cylinder piston rod being interconnected, by a loose linkage connection, with said piston rod of said master power cylinder to move said slave piston rod and piston a predetermined movement upon reciprocation of said master power cylinder piston rod,
   c. a first four-way switching valve,
      1. a conduit leading from each end of said master power cylinder to said first four-way switching valve,
      2. an inlet conduit and an outlet conduit leading into and from said first four-way switching valve,
   d. a mixer,
   e. a conduit connecting a source of primary liquid connected to said inlet of said first four-way switching valve,
      1. said outlet conduit of said first four-way switching valve being connected to said mixer,
      2. said primary liquid adapted to be alternately directed, by said first four-way switching valve, into one end of said master power cylinder and out at the other end thereof into the other of said conduits, so as to reciprocate said piston therein,
   f. a second four-way switching valve,
      1. a conduit leading from each end of said slave pump cylinder to said second four-way switching valve,
      2. a conduit connecting a source of secondary liquid to said inlet of said second four-way valve,
      3. an inlet conduit and an outlet conduit leading into and from said second four-way switching valve,
      4. said outlet of said second four-way valve connected to said mixer,
   g. a pilot valve,
      1. said piston rod of said master power cylinder connected to said pilot valve,
      2. fluid power means connected to said first four-way valve and to said second four-way valve to move said valves in synchronous, timed relation,
   h. a conduit connected with a source of fluid under pressure and with said pilot valve,
      1. conduits connecting said pilot valve and said fluid power means connected to said four-way valves to direct fluid to said power means in response to the movement of said piston rod of said master power cylinder,
      2. a control valve within said conduit leading from said primary liquid under pressure to said first four-way valve,
      3. control means associated with said control valve to close off the supply of primary liquid to said power cylinder upon one of said liquids becoming exhausted.

15. A device for metering two liquids to form a mixture of predetermined ratios, which device comprises;

a. a first double-acting master power cylinder, including a reciprocable piston mounted therein and having a piston rod secured thereto and extending outward therefrom in fluid tight relation,
   b. a slave pump cylinder, including a reciprocable piston mounted therein and having a piston rod secured thereto and extending outward therefrom in fluid tight relation, which slave pump cylinder is in side by side relation with said first double-acting master power cylinder,
   c. a transverse bar secured to the piston rod of said master power cylinder and being movable therewith,
   d. a pilot valve, having a longitudinally movable valve member therein, fitted in parallel relation with the axis of said cylinders and having a valve shifting rod extending outward therefrom,
      1. said transverse bar having an opening formed therein near each end thereof, one of which openings receives the piston rod of said slave pump cylinder, and the other of which openings receives the pilot valve shifting rod,
   e. a pair of four-way valves, each having a liquid inlet for a liquid to be mixed in a predetermined ratio to the other of the liquids, and each four-way valve having an outlet conduit,
      1. fluid power means connected to said four-way valves to move said valves synchronously,
      2. a conduit connected to each end of the respective cylinders in fluid communication, with the conduits from each end of one cylinder being connected to one of said four-way valves and the conduits from each end of the other cylinder being connected with the other of said four-way valves, 3. said power cylinder adapted to receive a primary liquid through one of said four-way valves to reciprocate said master power cylinder, the other of said four-way valves adapted to receive a secondary liquid thereinto and therethrough to be directed to said slave pump cylinder, f. abutments on said piston rod of said slave pump cylinder, 1. said transverse bar fitted between said abutments,
2. one of said aubtments being adjustable longitudinally of said rod to vary the longitudinal movement of the piston of said slave pump cylinder, upon reciprocation of said master power cylinder piston rod, g. spaced apart springs mounted on said pilot valve shifting rod to engage with said transverse bar upon reciprocation of said master power cylinder, to shift said pilot valve upon said transverse bar alternately engaging said springs, 1. conduit means connecting said pilot valve in fluid communication with said fluid power means to actuate said four-way valves, h. said first primary liquid and said secondary liquid which passes through said cylinders adapted to pass outward through said conduits into said four-way valves, i. a mixer, 1. said outlet conduit leading from each said four-way valve to said mixer to direct liquid discharged therefrom to a point of use.

* * * * *